United States Patent [19]
Blaxtan et al.

[11] Patent Number: 5,471,584
[45] Date of Patent: Nov. 28, 1995

[54] SPATIAL LIGHT MODULATOR WITH SUB-DIVIDED MODULATION ELEMENTS

[75] Inventors: Peter W. Blaxtan, Welwyn; John Gillespie, Ware, both of United Kingdom

[73] Assignee: Rank Brimar Limited, United Kingdom

[21] Appl. No.: 50,414

[22] PCT Filed: Nov. 18, 1991

[86] PCT No.: PCT/GB91/02034

§ 371 Date: Aug. 28, 1993

§ 102(e) Date: Aug. 28, 1993

[87] PCT Pub. No.: WO92/09001

PCT Pub. Date: May 29, 1992

[30] Foreign Application Priority Data

Nov. 16, 1990 [GB] United Kingdom .................. 9024979

[51] Int. Cl.⁶ ........................................................ G02F 1/31
[52] U.S. Cl. ........................... 359/263; 345/108; 359/267; 359/290; 359/318; 359/850
[58] Field of Search .................................... 359/263, 267, 359/290–292, 295, 315, 318, 319, 846, 847, 850–852; 345/84, 108

[56] References Cited

U.S. PATENT DOCUMENTS

| | | | |
|---|---|---|---|
| 3,886,310 | 5/1975 | Guldberg et al. | 348/771 |
| 4,566,935 | 1/1986 | Hornbeck | 437/228 |
| 4,596,992 | 6/1986 | Hornbeck | 359/291 X |
| 4,615,595 | 10/1986 | Hornbeck | 353/122 |
| 4,680,579 | 7/1987 | Ott | 348/755 |
| 4,842,396 | 6/1989 | Minoura et al. | 359/212 |
| 5,148,157 | 9/1992 | Florence | 359/318 X |
| 5,231,388 | 7/1993 | Stoltz | 345/84 |

FOREIGN PATENT DOCUMENTS

0391529 10/1990 European Pat. Off. .

OTHER PUBLICATIONS

Hornbeck, Larry J., *SPIE Critical Reviews Series* vol. 1150, "Deformable–Mirror Spatial Light Modulators", Aug. 6–11, 1989 (San Diego, Calif.), pp. 86–102.
Hornbeck, Larry J., et al., *SID 80 Digest*, "Deformable Mirror Projection Display", Jul. 20, 1993, pp. 228–229.
Hornbeck, Larry J., *IEEE Transactions on Electron Devices*, "128×128 Deformable Mirror Device", vol. ED–30, No. 5, May, 1983, pp. 539–545.
Wu, Wen R., et al., *SPIE vol. 825 Spatial Light Modulators and Applications II*, "Electro Optical Performance of an Improved Deformable Mirror Device", 1987, pp. 24–31 (No Month).
Gregory, Don A. et al., *Optics Letters*, "Optical Characteristics of a Deformable–Mirror Spatial Light Modulator", vol. 13, No. 1, Jan. 1988, pp. 10–12.
Cohn, Robert W., et al., *Applied Optics*, "Deformable Mirror Device Uses in Frequency Excision and Optical Switching", vol. 27, No. 5, Mar. 1, 1988, pp. 937–940.
Boysel, R. M. et al., *SPIE vol. 1151 Optical Information Processing Systems and Architectures*, "Deformable Mirror Light Modulators for Image Processing", 1989, pp. 183–194. (No Month).
Huignard, J. P., *J. Optics*, "Spatial Light Modulators and Their Applications", vol. 18, No. 4, 1987 (Paris, France), pp. 181–185. (No Month).
Thomas, R. N., et al., *IEEE Transactions on Electron Devices*, "The Mirror–Matrix Tube: A Novel Light Valve for Projection Displays", vol. Ed–22, No. 9, Sep., 1975, pp. 765–775.
Boysel, R. M., *Optical Engineering*, "A 128×128 Frame–Addressed Deformable Mirror Spatial Light Modulator", vol. 30, No. 9, Sep., 1991, pp. 1422–1427.

*Primary Examiner*—John D. Lee
*Attorney, Agent, or Firm*—Ostrolenk, Faber, Gerb & Soffen

[57] ABSTRACT

A spatial light modulator of the so-called deformable mirror device (DMD) type has an array of individual mirror ments (20) arranged in lines. The elements are individually driven to change their orientations. Portions (30) of the mirror ments are non-reflecting such as to divide the mirror elements into substantially equal portions forming a greater number of lines of narrower width, with a view to reducing the subjectively visible line structuring.

10 Claims, 3 Drawing Sheets

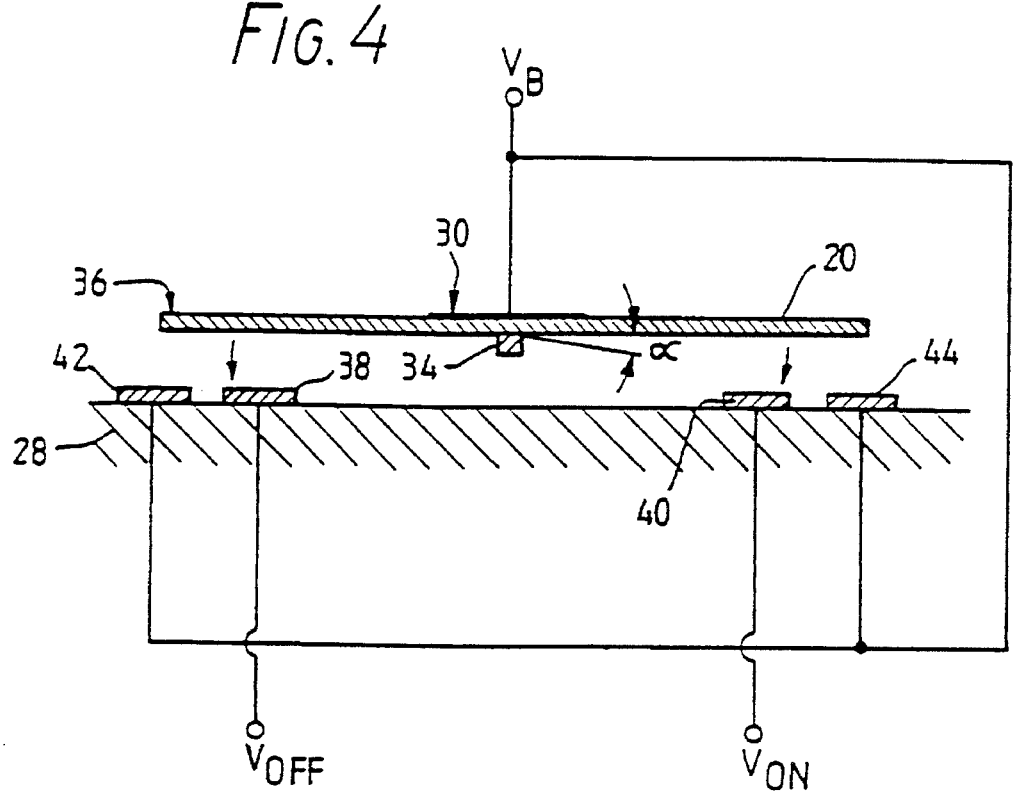

SPATIAL LIGHT MODULATOR WITH SUB-DIVIDED MODULATION ELEMENTS

BACKGROUND OF THE INVENTION

This invention relates to spatial light modulators, and particularly though not exclusively to the type of spatial light modulator which has become known as a deformable mirror device or DMD.

For a background description of several types of spatial light modulator reference may be made to HUIGNARD, J. P., "Spatial Light Modulators and their Applications, J. Optics (Paris), 1987, Vol. 18, No. 4, pp 181–186. By way of example another type of spatial light modulator is described in THOMAS, R. N. et. el. "The Mirror-Matrix Tube: A Novel Light Valve for Projection Displays", IEEE Transactions on Electron Devices, Vol. ED-22, No. 9, September 1975, pp 765–775.

The deformable mirror device is a particular type of spatial light modulator and comprises a micro-mechanical array of electronically addressable mirror elements, the elements corresponding to pixels. Each pixel mirror element is capable of mechanical movement in response to an electical input. Such movement is in practice more often a deflection rather than a deformation but the term deformable mirror device has now become accepted as the description of this class of devices. They may be digitally addressed in which case they can be referred to as digital mirror devices. The expression DMD covers all of these.

For a description of current DMD technology reference is made to HORNBECK, L. J., "Deformable-Mirror Spatial Light Modulators" Proc. SPIE Critical Reviews Series, Vol. 1150, 6–11 Aug. 1989, San Diego, Calif., U.S.A., pp 86–102. This paper contains many references to earlier work and attention is drawn particularly to references 3, 9, 14 and 23 of that paper. Further details of the construction of the devices is found in BOYSEL, R. M., "A 128 ×128 frame-addressed deformable mirror spatial light modulator" Optical Engineering, Vol. 30, No. 9, September 1991, pages 1422–1427. Attention is also drawn to reference 1 in that paper which is an earlier publication by Boysel et al. It has been proposed that DMDs should be usable as projection displays, see e.g. HORNBECK, L. J., et al., "Deformable Mirror Projection Display", SID 80 Digest, pp 228–229 (Abstract of presentation delivered Jul. 20, 1980 at SID Symposium), and U.S. Pat. No. 4,680,579.

The construction and manufacture of DMDs is further described in U.S. Pat. Nos. 4,615,595 and 4,566,935 and European Patent Application EP-A-0 391 529, all of Texas Instruments Incorporated.

The following description assumes a knowledge of the above-noted prior documents, all of which are hereby incorporated by reference.

In summary, the DMD is a solid state spatial light modulator that consists of an array of movable mirrors. These mirrors are suspended on high compliance torsional hinges. The physics of the mirrors are such that they can either be set to deflect light on to a screen or away from it. The DMD is therefore a binary device. The modulation of light intensity required to create full colour pictures is achieved by varying the time for which each mirror is switched on, in proportion to the value of the pixel at the given mirror position.

The current device consists of mirrors approximately 20 µm square, separated by a space of 2–3 µm. As noted above, it has been proposed to use a DMD in a projection television or video display. For the conventional (as opposed to HDTV) television signal version, there will be 576 lines of mirrors.

The problem with projection displays has always been to get enough light onto the screen. The mirror area therefore should be of maximum possible size.

However, with existing devices that seek to project television signals onto a large screen, the magnification involved can make the picture line structure subjectively visible. This can be overcome by line interpolation, but as well as being more complicated and frequently less than satisfactory, such process usually requires the display device to have twice as many active elements, doubling the cost and increasing complexity. This is particularly so with the DMD, which requires a complicated electronic interface to supply it with data in the required time.

SUMMARY OF THE INVENTION

An object of the invention is to provide a spatial light modulator in which a picture produced by the spatial light modulator is such that the picture line structure is subjectively less visible.

We have appreciated that the properties of the DMD are particularly suited to allow a simple and effective method to be used to that end.

According to this invention there is provided a spatial light modulator comprising an array consisting of a plurality of individual light-modifying pixel elements arranged in lines, and means for separately changing the condition of the individual light-modifying elements, and in which each individual light-modifying element is divided into substantially equal portions forming a greater number of lines of narrower width, and each element is constructed such that the portions of an individual element each result in an identical deflection of incident light.

Preferably the spatial light modulator takes the form of a deformable (or digital) mirror device having a plurality of individual mirror elements, portions of the mirror elements being non-reflecting such as to divide the mirror elements into substantially equal portions. Each mirror element may be divided into two portions by a central non-reflecting band. In principle the said portions may be non-reflecting because they were not rendered reflecting in the first place, i.e., the mirroring was masked, or because they are overprinted or otherwise have superposed on the mirror surface an opaque material.

BRIEF DESCRIPTION OF THE DRAWINGS

The invention will be described in more detail, by way of example, with reference to the accompanying drawings, in which:

FIG. 4 is a diagram illustrating the operation of one type of DMD with which the invention can be used.

DETAILED DESCRIPTION OF THE PREFERRED EMBODIMENT

Figure 1:
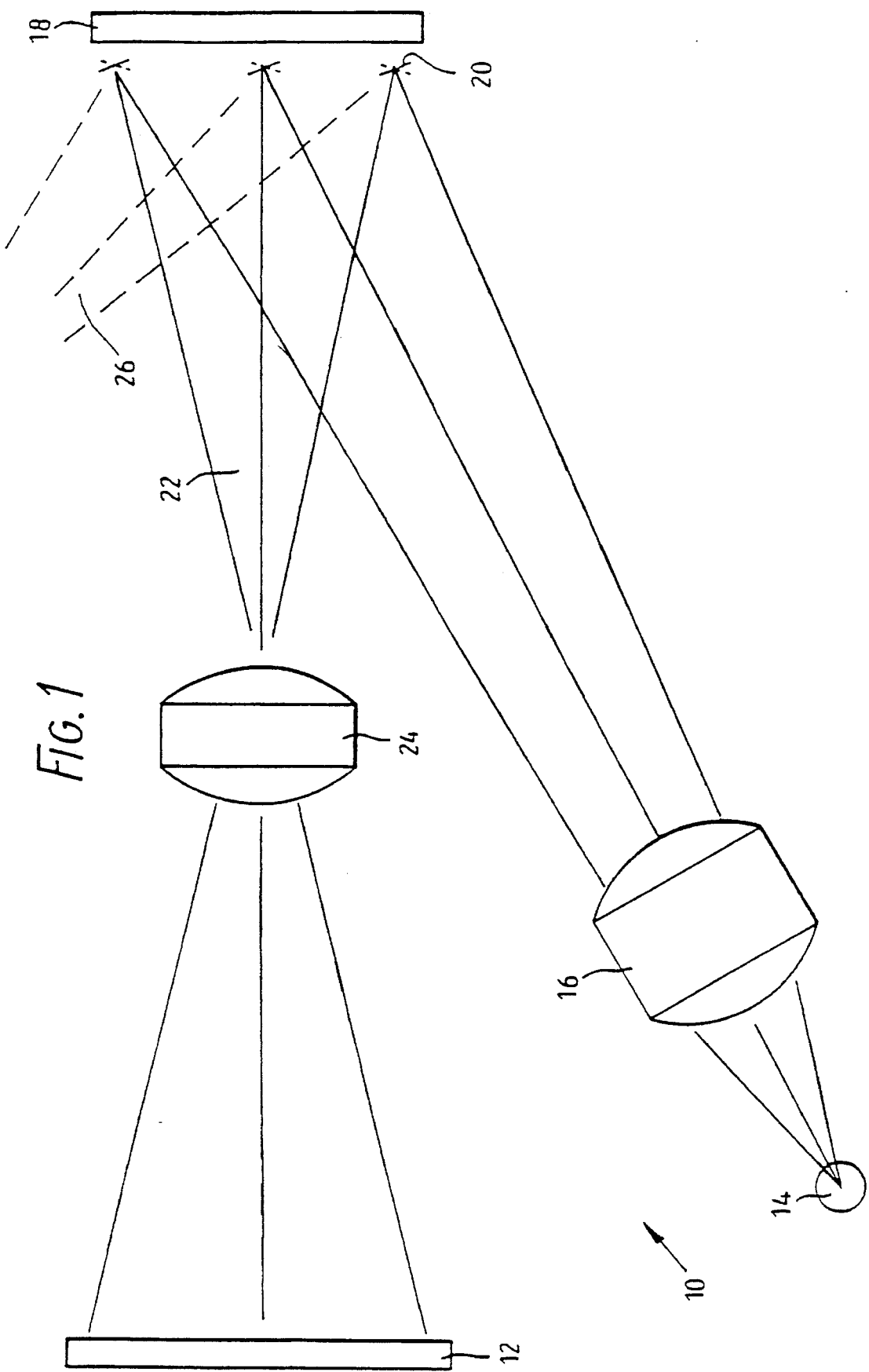
FIG. 1 is a schematic side elevational view of a projection display using a DMD.

A projection display 10 is shown in FIG. 1 which comprises a screen 12 and a powerful light source 14. Light from the light source is collected by an optical condenser assembly 16 and falls on a DMD 18. Each individual mirror element 20 of the DMD has two stable positions, as noted on the figure. In one position, shown in full lines, light is reflected along the path 22 through an optical projection lens system 24 by which it is imaged onto the screen 12. In the other stable position of the mirror element 20, shown in broken lines, light is reflected away from the projection lens system and the screen, as shown at 26. It should be noted that FIG. 1 is not to scale.

At any instant during a display, certain mirror elements 20 will be in their ON position (full lines) and the other mirror elements will be in their OFF position (broken lines), so that the instantaneous picture seen on the display will comprise a black and white picture.

Figure 2:
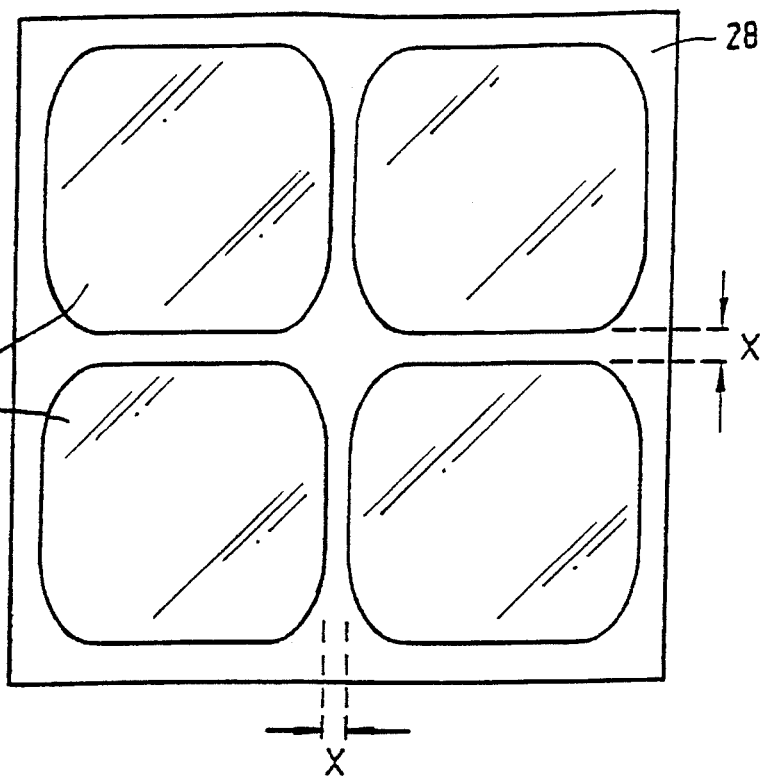
FIG. 2 illustrates the individual light-reflecting pixel mirror elements of a known DMD)

FIG. 2 is a front view of a small area of the DMD device showing some of the mirror elements 20 in a previously proposed system. The mirror elements fill as much as possible of the overall area, to maximise the amount of light reaching the screen. There is a finite distance between the mirror elements as shown at X, of the order of 2–3 µm, where the light will not be reflected but will impinge on and be absorbed by the substrate 28. Only a small number, namely four, of the mirror elements are shown. In a real array there will be many thousands, arranged in lines.

In use the mirrors are flipped back and forth between their ON and OFF positions. Shades of grey can be displayed by varying the mark-space ratio or effective proportion of the time for which a mirror is ON. The mark-space ratio may typically vary from black to white in steps of about 0.05% (some 2000 steps) to provide a high quality display. A colour display can be formed by the use of three devices reflecting red, green and blue light with the three images in register.

Figure 3:
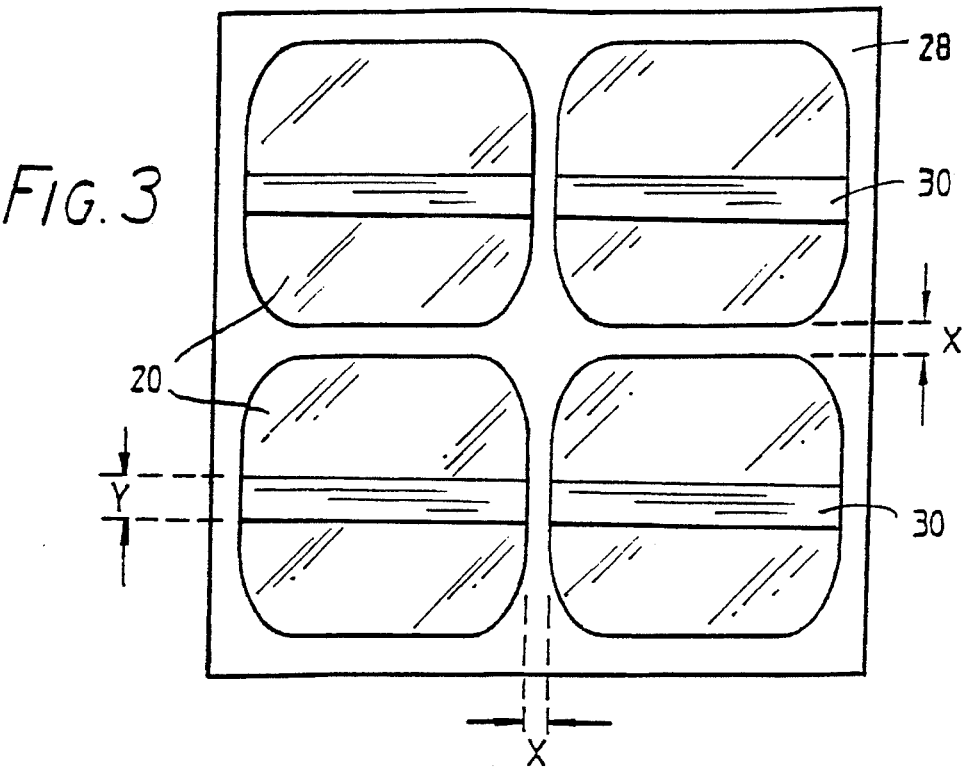
FIG. 3 is a view similar to FIG. 2 of a DMD embodying the present invention.

FIG. 3 diagrammatically shows the same portion as in FIG. 2 of a DMD device in accordance with this invention. Each mirror element 20 is now vertically divided into two by a non-reflecting horizontal strip 30. The width Y of the strip 30 is approximately the same as the inter-mirror spacing X. The strip is placed half-way down each mirror so as to divide the mirror into two halves of equal area. This simple change doubles the apparent number of lines displayed on the screen without introducing any extra electronics in the projection system, or extra complexity in the mirror.

The introduction of this strip produces a drop in transmitted light of 20×2/(20×20)=10%. This is acceptable given the advantages of the system in terms of perceived image quality. There is an increase in the energy delivered to the DMD substrate, but this can be accommodated easily.

Surprisingly, it appears that removal of part of the reflecting regions seems to improve the subjectively-perceived quality of the displayed picture.

The method of manufacture described in U.S. Pat. No. 4,566,935 can easily be modified in order to provide for the non-reflecting strip 30 shown in FIG. 3.

A side view of one of the mirror elements is given in FIG. 4. The mirror 20 comprises a torsion beam in the form of a plate, supported by a torsion rod 34 which in turn is supported at its ends (not shown). The substrate 28 carries a pair of control terminals 38,40 (address electrodes) symmetrically disposed around the axis of the torsion beam defined by the torsion bar 34. The control terminals 38,40 are connected to addressing lines (not shown) and a voltage is supplied to one or other. Also provided on the substrate 28 are a pair of landing electrodes 42,44 disposed under the edges of the torsion beam mirror element 20. On the outer surface of the torsion beam is a reflective coating 36 with the non-reflecting strip 30 thereon. The landing electrodes 42,44 are electrically connected to the torsion beam 20, which is conductive, and is connected to a bias voltage source $V_B$. Each modulator has individual control terminal lines $V_{ON}$, $V_{OFF}$ connected to the control terminals 38,40.

In use, generally speaking, the application of a voltage to one control terminal 40 will set up an electric field between the control terminal 40 and the torsion beam 20; the voltage supplied to the control terminal 40 is generally such that the field is attractive. The beam 20 therefore tends to rotate through an angle α towards the control terminal 40 depending upon the magnitude of the field, thus changing the orientation of the torsion beam. The torsion bar 34 tends to resist any such rotation. If the field is sufficiently strong the beam 20 will be drawn to make physical contact with the landing electrode 44; to avoid unwanted discharge the two are connected in common. The magnitude of the attractive field is controlled therefore by the bias voltage $V_B$ applied to the beam 20 and by the voltage applied to the control electrode 40. It would be possible to simultaneously apply a voltage to the other control electrode 38, but in practice this is avoided. Depending on the magnitude of the bias voltage, the torsion beam 20 may have two or three stable positions.

For further description reference should be made to the documents cited in the introduction of this application.

Further features that may be used in conjunction with the present embodiment are described in International Patent Applications Nos. PCT/GB91/02032, PCT/GB91/02033 and PCT/GB91/02035 (Agents Refs: 31678, 31974, 31978) the disclosure of which is hereby incorporated by reference.

We claim:

1. A spatial light modulator, comprising:
   (a) a plurality of individual unitary light-modifying pixel elements, said pixel elements being arranged in a plurality of lines to form an array; and
   (b) means for separately changing the light-modifying condition of each of said individual light-modifying elements;
   (c) each of said pixel elements including:
      i) an active surface from or through which light may be reflected or transmitted; and
      ii) one or more inactive bands on said active surface, said inactive band or bands dividing said active surface of said pixel element into a plurality of substantially equal light-modifying portions forming a greater number of lines of narrower width than the width of said pixel element; and wherein
      iii) all said portions on each said pixel element each result in an identical light-modifying action.

2. A spatial light modulator according to claim 1, in which each individual light-modifying element is divided into two portions of substantially equal area.

3. A spatial light modulator according to claim 1, in which each individual light-modifying element is divided into discrete portions.

4. A spatial light modulator according to claim 1, in which the light-modifying elements are divided by bands of substantially the same width as the inter-element spacing.

5. A digital mirror spatial light modulator, comprising:
   (a) a plurality of individual unitary deflectable mirror elements arranged in lines to form a mirror array; and
   (b) means for separately changing the orientation of said individual mirror elements;
   (c) each of said mirror elements including:
      i) a mirror surface for reflecting light incident thereon; and ii) one or more non-reflecting bands on said mirror surface, said non-reflecting bands dividing said mirror elements into a plurality of substantially equal portions forming a greater number of lines of narrower width than the width of said individual mirror element; and wherein iii) all said portions on each said mirror element each result in an identical light-modifying action.

6. A digital mirror spatial light modulator according to claim 5, in which each individual mirror element is divided into two portions by a central band.

7. A digital mirror spatial light modulator according to claim 5, in which each individual mirror element is divided into discrete portions.

8. A digital mirror spatial light modulator according to claim 5, in which the mirror elements are divided by bands of substantially the same width as the inter-element spacing.

9. A digital mirror spatial light modulator according to claim 5, in which the non-reflecting portions comprise portions from which the mirroring is masked.

10. A digital mirror spatial light modulator according to claim 5, in which the non-reflecting portions comprise opaque regions superimposed upon the mirror surface.

* * * * *